(12) United States Patent
Hayutin et al.

(10) Patent No.: US 7,509,339 B2
(45) Date of Patent: Mar. 24, 2009

(54) SYSTEM AND METHOD OF IMPLEMENTING PERSONALIZED ALERTS UTILIZING A USER REGISTRY IN INSTANT MESSENGER

(75) Inventors: Wesley David Hayutin, Raleigh, NC (US); Howard Sherman Krovetz, Holly Springs, NC (US); Ruthie D. Lyle, Durham, NC (US); Veronique Le Shan Tice Moses, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 11/325,141

(22) Filed: Jan. 3, 2006

(65) Prior Publication Data

US 2007/0168519 A1    Jul. 19, 2007

(51) Int. Cl.
G06F 17/00        (2006.01)
(52) U.S. Cl. .................. 707/102; 707/100; 707/101; 707/3
(58) Field of Classification Search ......... 707/100–102, 707/3
See application file for complete search history.

(56) References Cited

U.S. PATENT DOCUMENTS

| | | | |
|---|---|---|---|
| 2002/0178072 A1 | 11/2002 | Gusler et al. | |
| 2002/0198946 A1 | 12/2002 | Wang et al. | |
| 2004/0030753 A1 | 2/2004 | Horvitz | |
| 2004/0103156 A1 | 5/2004 | Quillen et al. | |
| 2004/0203923 A1 | 10/2004 | Mullen | |
| 2004/0205775 A1 | 10/2004 | Heikes et al. | |
| 2005/0058268 A1 | 3/2005 | Koch | |
| 2005/0108348 A1 | 5/2005 | Lee | |
| 2005/0160167 A1 | 7/2005 | Cheng et al. | |
| 2006/0020677 A1* | 1/2006 | von Koch | 709/207 |
| 2006/0285672 A1* | 12/2006 | Levy et al. | 379/202.01 |
| 2007/0016643 A1* | 1/2007 | Boss et al. | 709/206 |

* cited by examiner

Primary Examiner—Sana Al-Hashemi
(74) Attorney, Agent, or Firm—Martin J. McKinley; Law Office of Jim Boice

(57) ABSTRACT

A system and method for implementing personalized alerts utilizing a user registry in instant messenger. A first client logs on to a server utilizing an instant messenger program. The first client selects at least one attribute that describes at least one user in a user registry. After selecting the attributes, the first client selects a personalized alert to associate with the selected attributes. If a second client with characteristics described by the selected attributes sends the first client a message, the assigned personalized alert will be activated.

11 Claims, 15 Drawing Sheets

```
                                    370
                                    ~

LAST NAME:      MACHADO ~380a
        FIRST NAME:     CARLOS ~382a
        MIDDLE INITIAL: A ~384a              392a
        PHONE NUMBER:   512-555-1234 ~386a
        TITLE:          MANAGER ~388a
        WORKGROUP:      GROUP 1 ~390a

LAST NAME:      GRACIE ~380b
        FIRST NAME:     ROYCE ~382b          392b
        MIDDLE INITIAL: M ~384b
        PHONE NUMBER:   818-555-1343 ~386b
        TITLE:          PROGRAMMER ~388b
        WORKGROUP:      GROUP 1 ~390b

LAST NAME:      BELFORT ~380c
        FIRST NAME:     VITOR ~382c          392c
        MIDDLE INITIAL: W ~384c
        PHONE NUMBER:   972-555-8342 ~386c
        TITLE:          MANAGER ~388c
        WORKGROUP:      GROUP 2 ~390c
```

370

LAST NAME: MACHADO ~380a
FIRST NAME: CARLOS ~382a
MIDDLE INITIAL: A ~384a          392a
PHONE NUMBER: 512-555-1234 ~386a
TITLE: MANAGER ~388a
WORKGROUP: GROUP 1 ~390a

LAST NAME: GRACIE ~380b
FIRST NAME: ROYCE ~382b          392b
MIDDLE INITIAL: M ~384b
PHONE NUMBER: 818-555-1343 ~386b
TITLE: PROGRAMMER ~388b
WORKGROUP: GROUP 1 ~390b

LAST NAME: BELFORT ~380c
FIRST NAME: VITOR ~382c          392c
MIDDLE INITIAL: W ~384c
PHONE NUMBER: 972-555-8342 ~386c
TITLE: MANAGER ~388c
WORKGROUP: GROUP 2 ~390c

FIG. 3C

SYSTEM AND METHOD OF IMPLEMENTING PERSONALIZED ALERTS UTILIZING A USER REGISTRY IN INSTANT MESSENGER

BACKGROUND OF THE INVENTION

The present invention relates in general to the field of computers and similar technologies, and in particular to software utilized in this field.

Early computers were stand-alone units, which accessed and processed only local databases using local computer programs. Today, however, modern computers are often networked, thus providing client computers on a network access to a variety of resources, including data, computer programs, hardware devices (including storage drives and printers), etc. This resource availability is especially prevalent with the advent of the Internet, World Wide Web, private intranets and extranets, etc., which provide access to web pages, databases, programs, and similar resources.

One of the most popular Internet applications is instant messenger. Members of an instant messenger (IM) service (e.g., AOL®, MSN®, Yahoo!®, ICQ®, IBM Lotus Notes Sametime Connect®,etc.) can type messages to each other and respond in real time. There is a need, however, for a system and method of personalized notification to users when other users perform actions within the instant messenger service.

SUMMARY OF THE INVENTION

The present invention includes a system and method for implementing personalized alerts utilizing a user registry in instant messenger. A first client logs on to a server utilizing an instant messenger program. The first client selects at least one attribute that describes at least one user in a user registry. After selecting the attributes, the first client selects a personalized alert to associate with the selected attributes. If a second client with characteristics described by the selected attributes sends the first client a message, the assigned personalized alert will be activated.

The above, as well as additional. purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, wherein:

FIG. 3C depicts an exemplary user registry according to a preferred embodiment of the present invention;

DETAILED DESCRIPTION OF A PREFERRED EMBODIMENT

Figure 1:
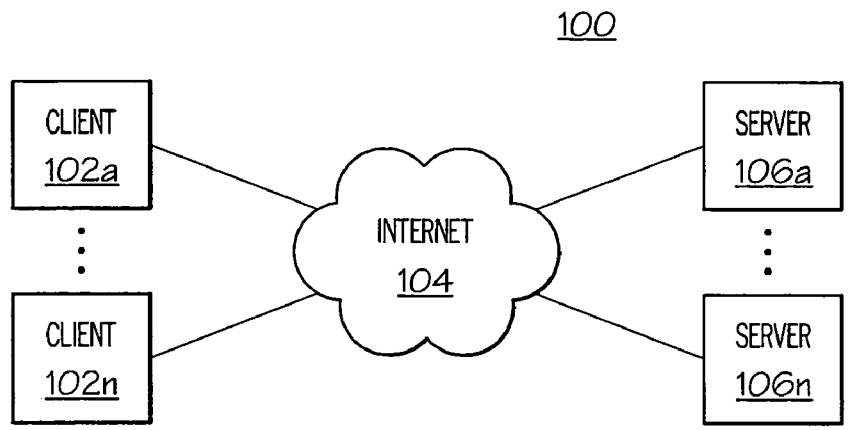
FIG. 1 depicts an exemplary network in which a preferred embodiment of the present invention may be implemented.

Referring now to the figures, and in particular, referring to FIG. 1 there is illustrated an exemplary network in which a preferred embodiment of the present invention may be implemented. As depicted, network 100 includes clients 102a-n, Internet 104, and servers 106a-n. In a preferred embodiment of the present invention, servers 106a-n preferably operate as chat servers that provide the instant messaging service to clients 102a-n. Clients 102a-n are users of the instant messaging service and are coupled to servers 106a-n via Internet 104.

Those skilled in the art will appreciate that network 100 can include many additional components (e.g., routers, firewalls, etc.) not specifically illustrated in FIG. 1. Because such additional components are not necessary for an understanding of the present invention, they are not illustrated in FIG. 1 or discussed further herein.

Figure 2:
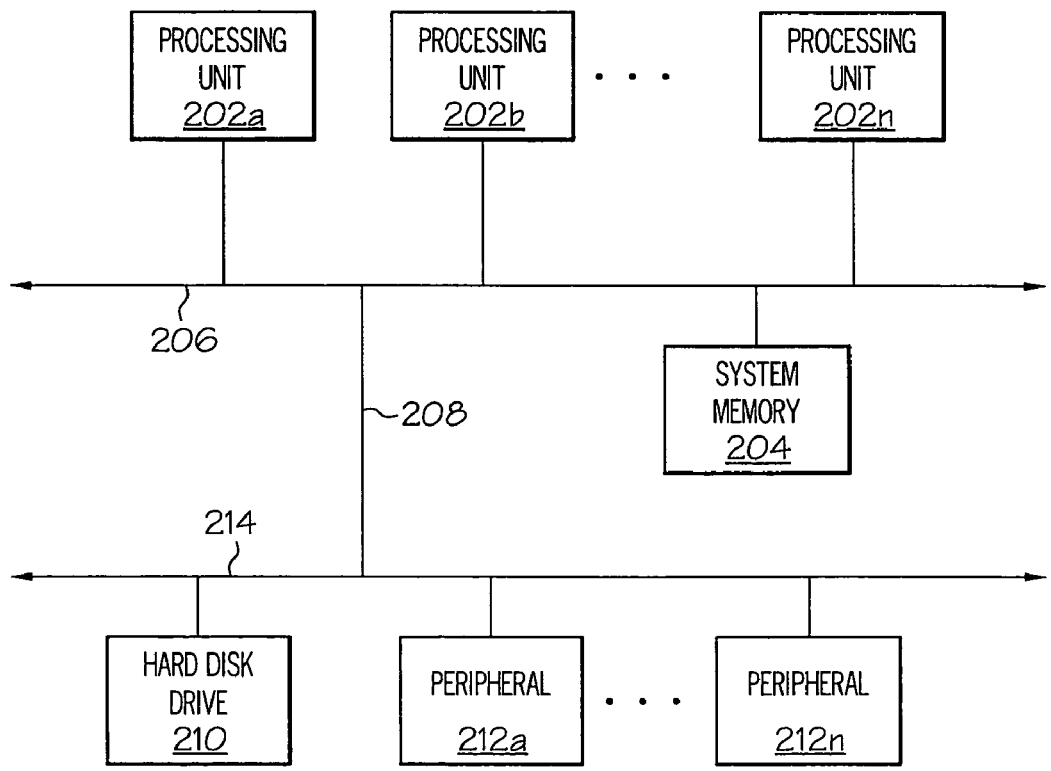
FIG. 2 illustrates an exemplary client computer in which a preferred embodiment of the present invention may be implemented.

FIG. 2 is a block diagram illustrating an exemplary data processing system 200 in which a preferred embodiment of the present invention may be implemented. Those with skill in the art will appreciate that data processing system 200 may be utilized to implement both clients 102a-n and servers 106a-n. As depicted, exemplary data processing system 200 includes processing unit(s) 202, shown as processing units 202a and 202b in FIG. 2, which are coupled to system memory 204 via system bus 206. Preferably, system memory 204 may be implemented as a collection of dynamic random access memory (DRAM) modules. Typically, system memory 204 includes data and instructions for running a collection of applications. Mezzanine bus 208 acts as an intermediary between system bus 206 and peripheral bus 214. Those with skill in this art will appreciate that peripheral bus 214 may be implemented as a peripheral component interconnect (PCI), accelerated graphics port (AGP), or any other peripheral bus. Coupled to peripheral bus 214 is hard disk drive 210, which is utilized by data processing system 200 as a mass storage device. Also coupled to peripheral bus 214 is a collection of peripherals 212a-n.

Those skilled in the art will appreciate that data processing system 200 can include many additional components not specifically illustrated in FIG. 2. Because such additional components are not necessary for an understanding of the present invention, they are not illustrated in FIG. 2 or discussed further herein. It should also be understood, however, that the enhancements to data processing system 200 for implementing personalized alerts utilizing a user registry in instant messenger provided by the present invention are applicable to data processing systems of any system architecture and are in no way limited to the generalized multiprocessor architecture or symmetric multi-processing (SMP) architecture illustrated in FIG. 2.

Figure 3A:
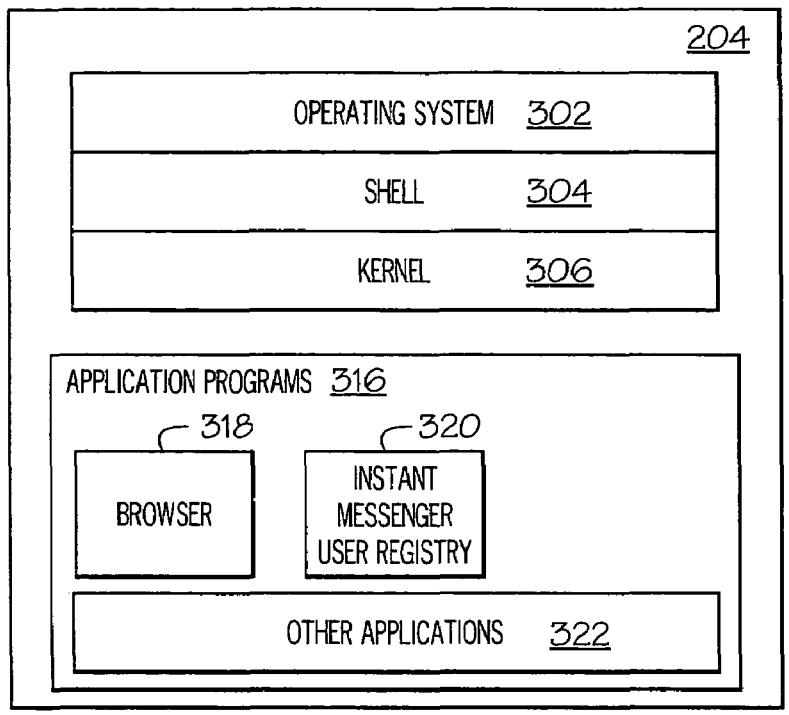
FIG. 3A depicts exemplary contents of a system memory of a client computer as illustrated in FIG. 2 according to a preferred embodiment of the present invention.

FIG. 3A is a block diagram illustrating exemplary contents of system memory 204 of clients 102a-n, according to a preferred embodiment of the present invention. As illustrated, system memory 204 includes operating system 302, which further includes shell 304 for providing transparent user access to resources such as application programs 316. Generally, shell 304 is a program that provides an interpreter and an interface between the user and the operating system. More specifically, shell 304 executes commands that are entered into a command line user interface or a file. Thus, shell 304 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 306) for processing. Note that while shell 304 is a text-based, line-oriented user interface, the present invention will support other user interface modes, such as graphical, voice, gestural, etc. equally well.

As illustrated, operating system 302 also includes kernel 306, which includes lower levels of functionality for operating system 302, including providing essential services required by other parts of operating system 302 and application programs 316, including memory management, process and task management, disk management, and mouse and keyboard management. Application programs 316 can include a browser 318, utilized for access to Internet 104, instant messenger 320 (discussed herein in more detail in conjunction with FIGS. 4A and 5), word processors, spreadsheets, and other application programs 322.

Figure 3B:
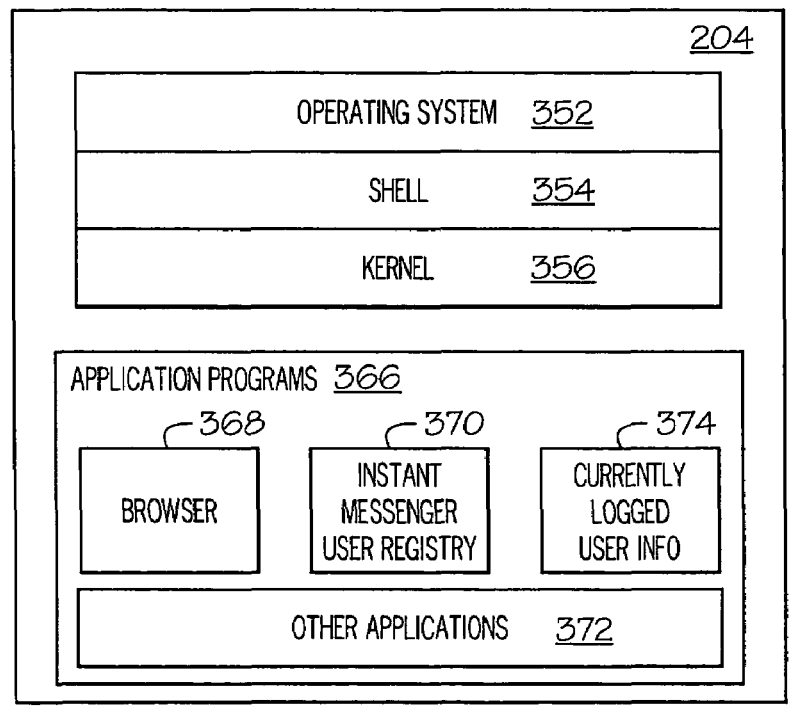
FIG. 3B illustrates exemplary contents of a system memory of a server as illustrated in FIGS. 1 and 2 according to a preferred embodiment of the present invention.

FIG. 3B is a block diagram illustrating exemplary contents of system memory 204 of servers 106a-n, according to a preferred embodiment of the present invention. As illustrated, system memory 204 includes operating system 352, which further includes shell 354 for providing transparent user access to resources such as application programs 366. Generally, shell 354 is a program that provides an interpreter and an interface between the user and the operating system. More specifically, shell 354 executes commands that are entered into a command line user interface or a file. Thus, shell 354 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 356) for processing. Note that while shell 354 is a text-based, line-oriented user interface, the present invention will support other user interface modes, such as graphical, voice, gestural, etc. equally well.

As illustrated, operating system 352 also includes kernel 356, which includes lower levels of functionality for operating system 352, including providing essential services required by other parts of operating system 352 and application programs 366, including memory management, process and task management, disk management, and mouse and keyboard management. Application programs 366 can include a browser 368, utilized for access to Internet 104, instant messenger user registry 370 (discussed herein in more detail in conjunction with FIG. 5), currently logged user information 374, word processors, spreadsheets, and other application programs 372.

FIG. 3C illustrates an exemplary instant messenger user registry 370 according to a preferred embodiment of the present invention. Instant messenger user registry 370 is preferably stored in system memory 204 and/or hard disk drive 210 of servers 106a-n. As illustrated, instant messenger user registry 370 includes a collection of registry entries 392a-c that includes multiple fields that describe a particular user of the instant messenger system. Those with skill in the act will appreciate that user registry 370 is in no way limited to three entries, but can include any number of entries.

Registry entries 392a-c includes last name field 380a-c, first name field 382a-c, middle initial field 384a-c, phone number field 386a-c, title field 388a-c, and workgroup field 390a-c. Those with skill in the art will appreciate that entries within instant messenger user registry 370 may include any type of information field and are in no way limited to the fields depicted in FIG. 3C. According to a preferred embodiment of the present invention, when clients 102a-n log on to servers 106a-n via instant messenger 320, contact list 402 (discussed in more detail in conjunction with FIG. 4A) may be populated with entries from instant messenger user registry 370. Instant messenger user registry 370 may also be parsed by instant messenger 320 to retrieve contact information from registry entries 390a-c.

Figure 4A:
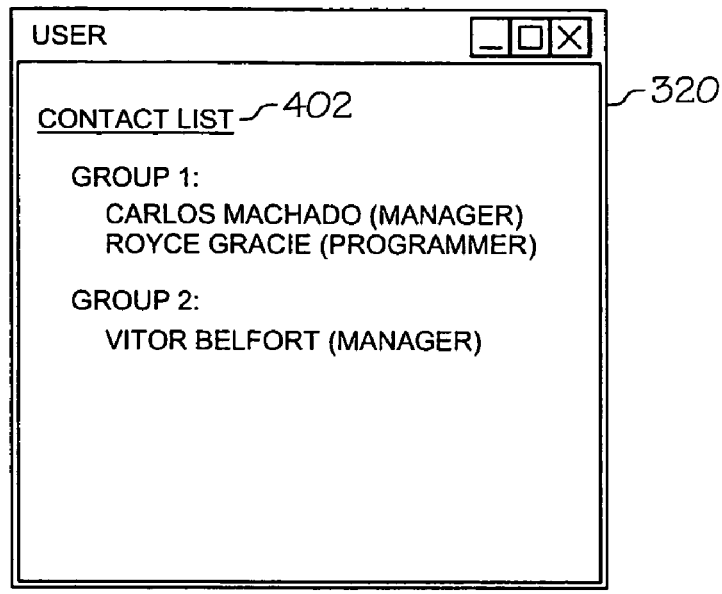
FIG. 4A illustrates an exemplary client interface for instant messenger 320 according to a preferred embodiment of the present invention.

FIG. 4A illustrates an exemplary client interface for instant messenger 320 according to a preferred embodiment of the present invention. As illustrated, instant messenger 320 includes a contact list 402. Contact list 402 includes a collection of frequently accessed contacts that may be selected by a user to begin a chat session via chat window 406, as depicted in FIG. 4B.

Figure 4B:
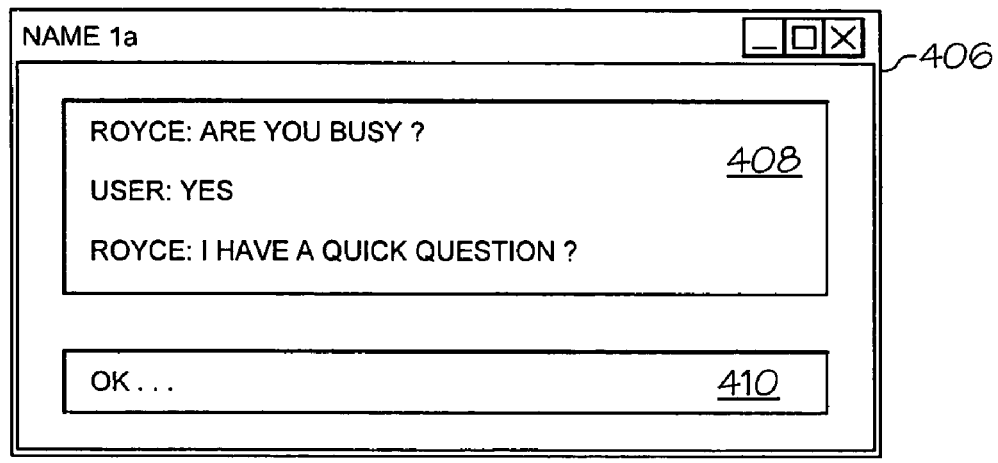
FIG. 4B depicts an exemplary chat window for instant messenger 320 according to a preferred embodiment of the present invention.

FIG. 4B depicts an exemplary chat window 406 for instant messenger 320 according to a preferred embodiment of the present invention. As depicted, chat window 406 includes conversation screen 408 and response field 410. As well-known to those with skill in the art, conversation screen 408 displays the conversation between the contact and the user and response field 410 enables the user to type a message to continue the conversation.

Figure 4C:
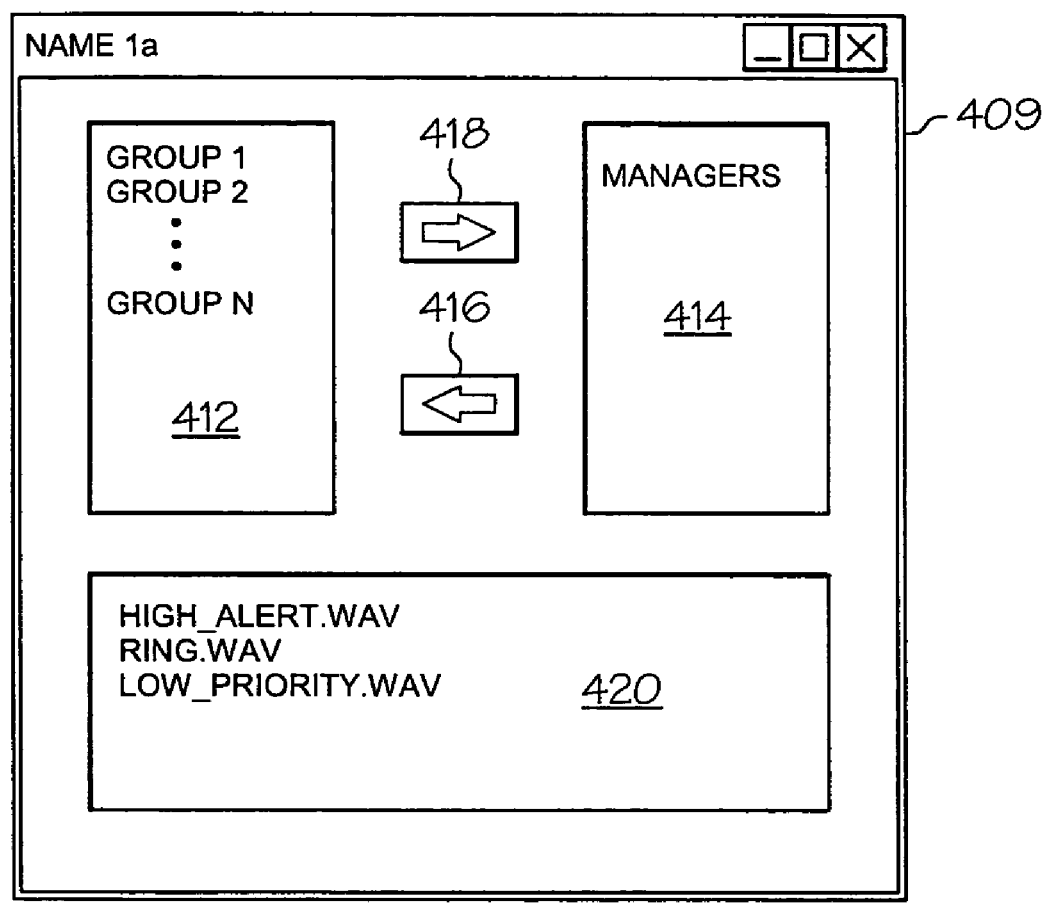
FIG. 4C illustrates an exemplary alert settings screen for instant messenger 320 according to a preferred embodiment of the present invention.

FIG. 4C illustrates an exemplary alert settings screen 409 for instant messenger 320 according to a preferred embodiment of the present invention. Alert settings screen 409 includes available attribute list 412, selected attribute list 414, attribute transfer buttons 416-418, and alert selection list 420. Available attribute list 412 includes a list of predetermined or user-defined attributes (e.g., "MANAGERS", "GROUP1", etc.). These attributes are utilized to define at least one contact in instant messenger user registry 370. For example, "MANAGER" defines a collection of contacts who are all managers in a company, as indicated by the entries in internet messenger user registry 370. Accordingly, "GROUP 1" defines a collection of contacts who are all members of "GROUP 1", as indicated by the entries in internet messenger user registry 370.

Attribute transfer buttons 416-418 move attributes between available attribute list 412 and selected attribute list 414. Alert selection list 420 includes a collection of unique alerts that may be assigned to attributes listed on selected attribute list 414. If more than one attribute is moved to selected attribute list 414 and a unique alert is selected from alert selection list 420, only messages from users within internet messenger user registry 370 that are characterized by both attributes will trigger the selected alert. A preferred method of determining if a user meets the selected attributes is to parse internet messenger user registry 370 for an entry corresponding to the user and parsing the entry fields to determine if the user meets the selected attributes. For example, if the attributes of "MANAGERS" and "GROUP 1" are selected, the selected alert will be triggered only by a message from "Carlos Machado" (entry 392*a* from FIG. 3C) who is a manager within group 1.

Figure 5:
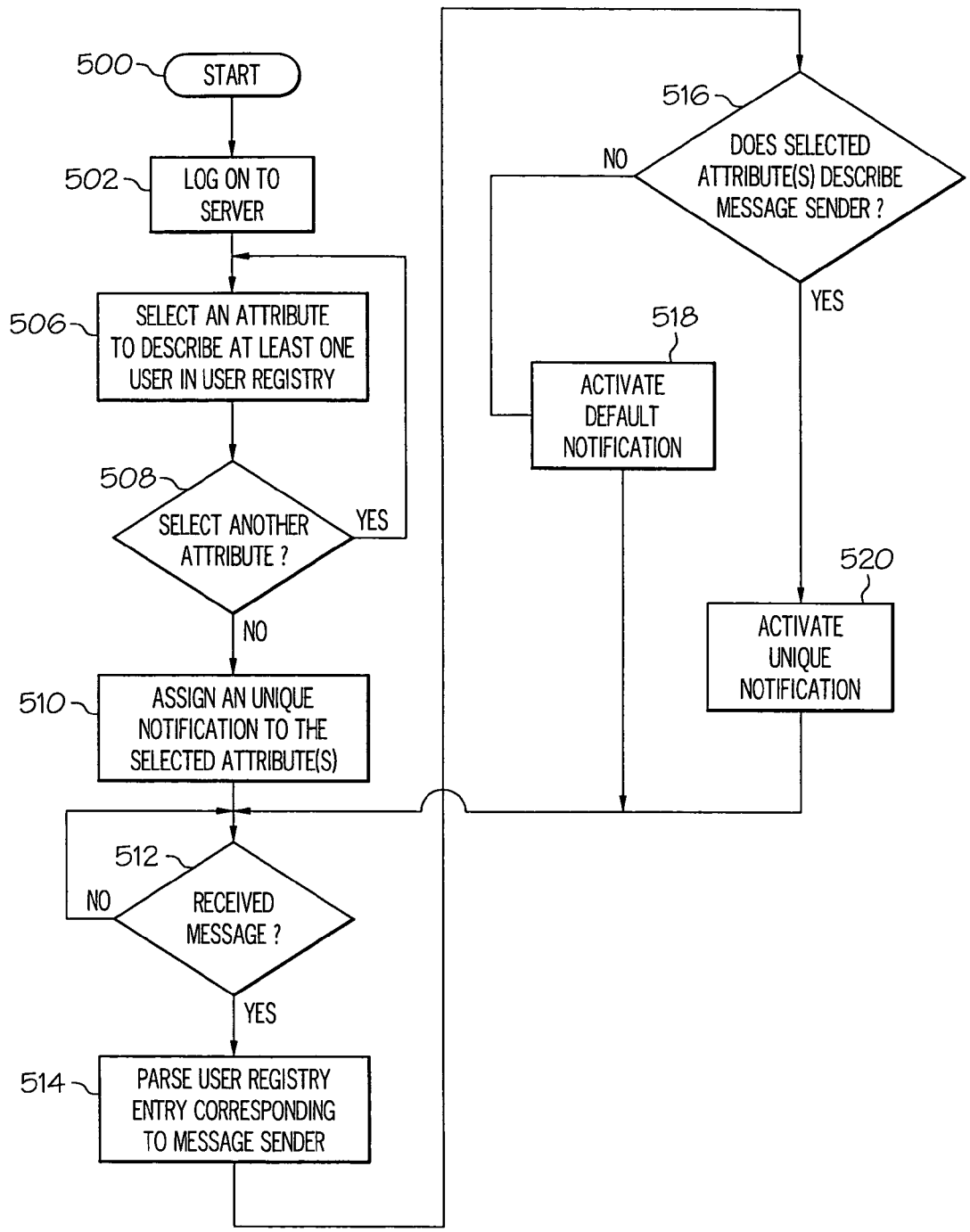
FIG. 5 is a high-level logical flowchart diagram illustrating a preferred method of implementing personalized alerts utilizing user registry in instant messenger according to a preferred embodiment of the present invention.

FIG. 5 is a high-level logical flowchart illustrating an exemplary method of implementing personalized alerts utilizing user registry in instant messenger according to a preferred embodiment of the present invention. The process begins at step 500 and proceeds to step 502, which illustrates a client (e.g., client 102*a*) starting instant messenger 320 to log on to servers 106*a-n* to access instant messenger user registry 370. Preferably, the log-on process includes client 102*a* sending connection information (e.g., IP address and the number of the port assigned to instant messenger 320) to servers 106*a-n*. Servers 106*a-n* store the connection information for client 102*a* in currently logged user information 374. When a client (e.g., client 102*b*) sends a message to another, logged client (e.g., client 102*a*), servers 106*a-n* may relay the message to the recipient client 102*a* based on the stored connection information corresponding to recipient client 102*a*.

The process proceeds to step 506, which illustrates an attribute from attribute list 412 being transferred to selected attribute list 414. The transfer of the attribute from one list to another is preferably accomplished via alert settings screen 409, as illustrated in FIG. 4C. The process continues to step 508, which depicts a determination made as to whether or not another attribute is to be selected. If another attribute is to be selected, the process returns to step 506 and continues in an iterative fashion. If another attribute is not to be selected, the process continues to step 510, which illustrates a unique notification being assigned to the attributes on selected attribute list 414. As depicted, alert selection list 420 includes a collection of alerts (e.g., sound files) that may be assigned to attributes in selected attribute list 414. Those with skill in the art will appreciate that the collection of alerts is not limited to sound files, but may include any alert including, but not limited to visual, aural, or tactile alerts. If more than one attribute is selected, the selected alert sounds only when a message is received from a contact that is described by all selected attributes.

As indicated in steps 506-508, a preferred embodiment of the present invention enables the assignment of alerts to multiple attributes. For example, if a user desires that a personalized alert be assigned to the attributes of "MANAGERS" and "GROUP 1", any user in instant messenger user registry 370 that includes both of those attributes that sends the user an instant message will invoke the assigned personalized alert.

The process continues to step 512, which illustrates instant messenger 320 determining if a message has been received. If a message has not been received, the process iterates at step 512. If a message has been received by instant messenger 320, the process continues to step 514, which illustrates instant messenger 320 parsing a user registry entry (e.g., user registry entries 392*a-c*) corresponding to the message sender.

If the attributes selected in steps 506-508 describe the message sender (step 516), the process continues to step 520, which illustrates instant messenger 320 activating the unique notification assigned in step 510. The process then returns to step 512 and proceeds in an iterative fashion. If the attributes selected in steps 506-508 do not describe the message sender, the process continues to step 518, which depicts instant messenger 320 activating a default notification. The process returns to step 512 and continues in an iterative fashion.

As described, the present invention includes a system and method for implementing personalized alerts utilizing a user registry in instant messenger. A first client logs on to a server utilizing an instant messenger program. The first client selects at least one attribute that describes at least one user in a user registry. After selecting the attributes, the first client selects a personalized alert to associate with the selected attributes. If a second client with characteristics described by the selected attributes sends the first client a message, the assigned personalized alert will be activated.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. It should be understood, therefore, in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

Thus, the method described herein, and in particular as shown and described in FIG. 5, can be deployed as a process software from a service provider server (e.g., servers 106*a-n*) to client computer, such as clients 102*a-n*.

Figure 6A:
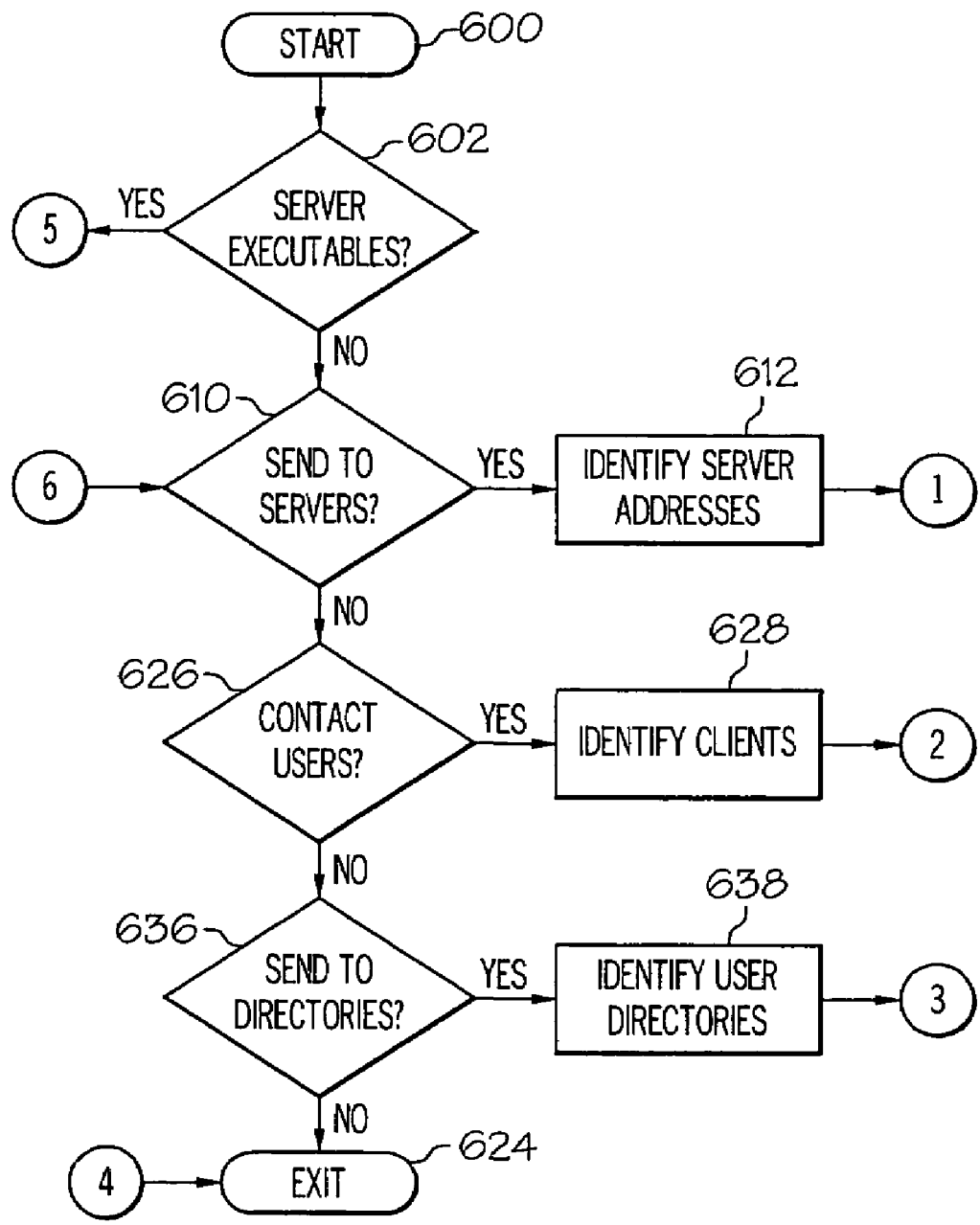
FIGS. 6A-B show a flowchart of steps taken to deploy software capable of executing the steps shown and described in FIG. 5.
Figure 6B:
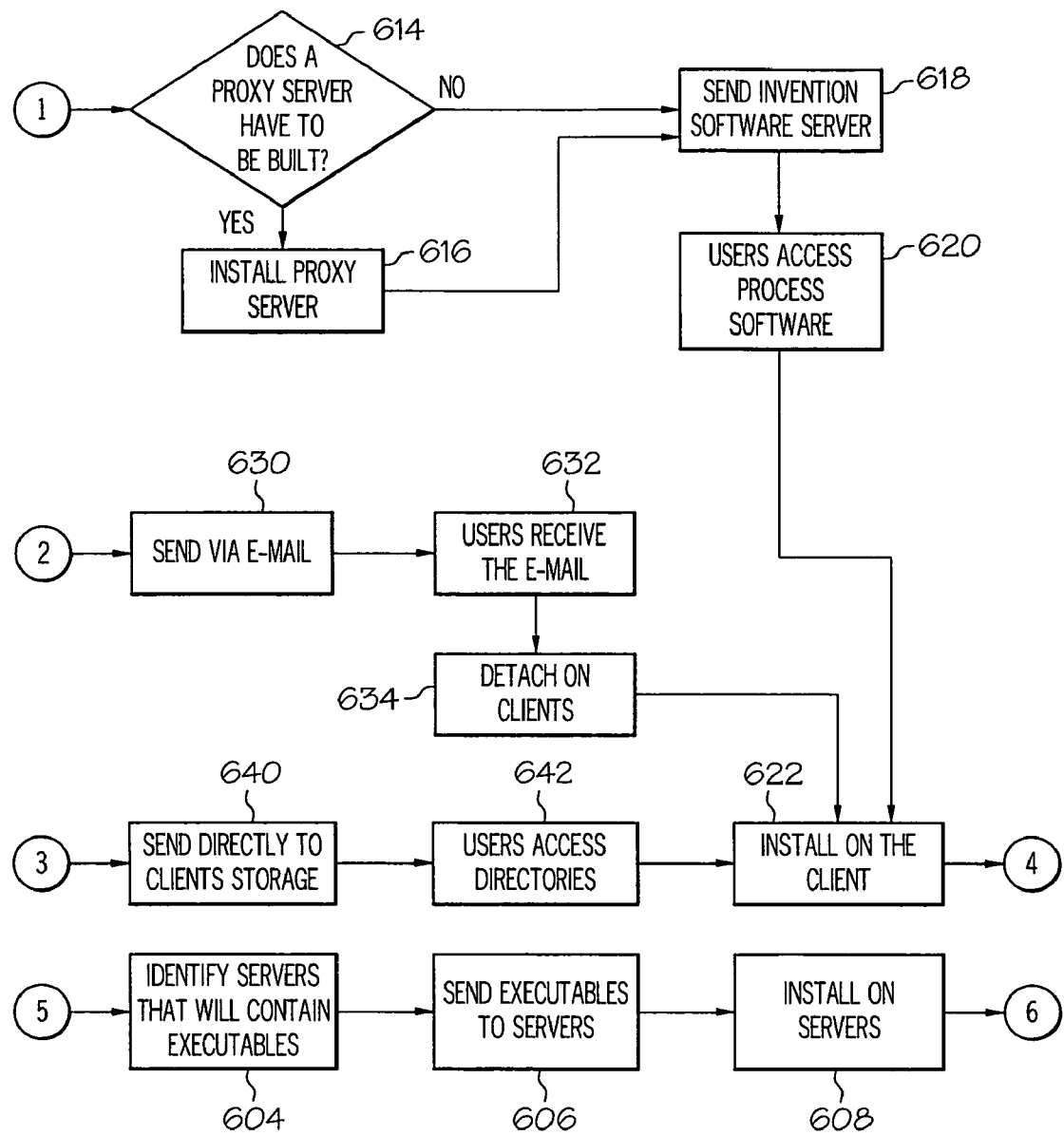

Referring then to FIG. 6, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made on whether the process software will be sent directly to user directories on their client computers (query block 636). If so, the user directories are identified (block 638). The process software is transferred directly to the user's client computer directory (block 640). This can be done in several ways such as, but not limited to, sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is built on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7A:
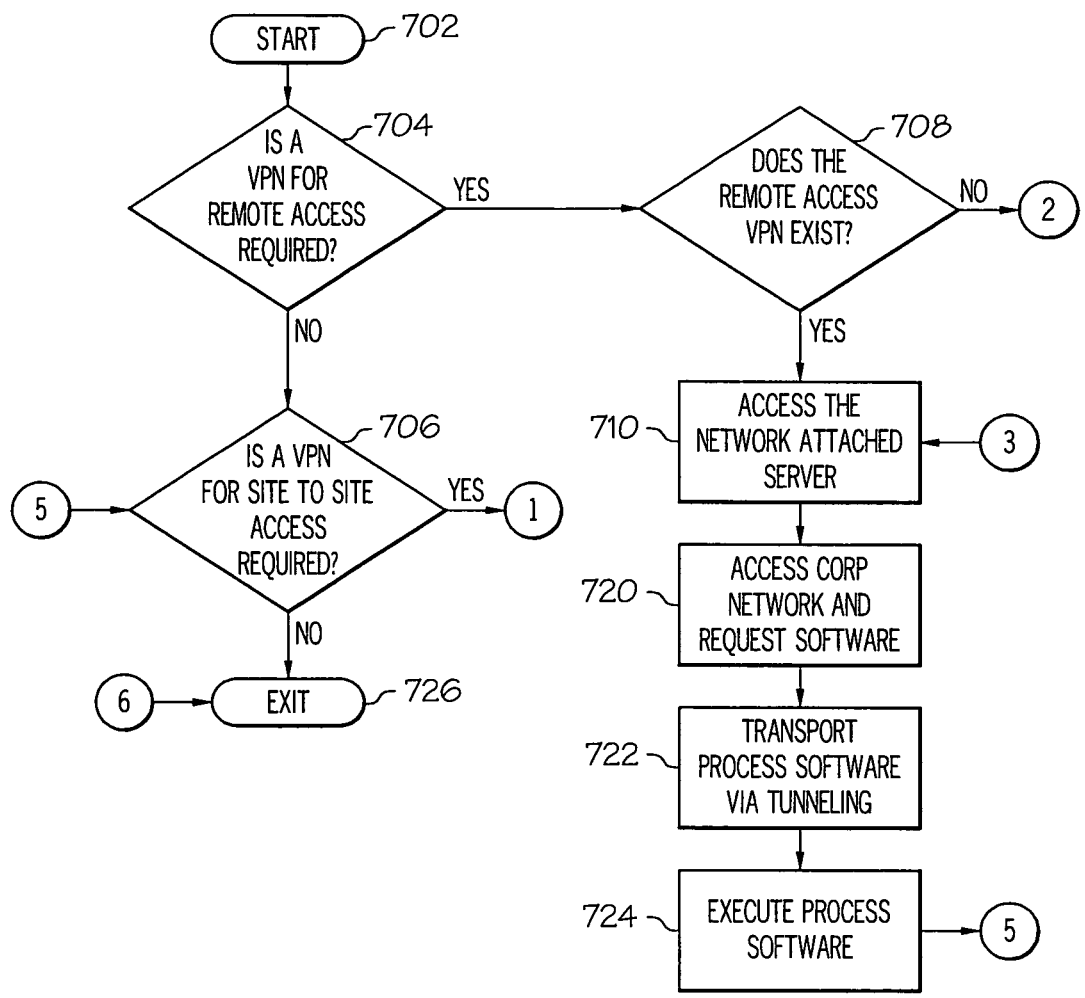
FIGS. 7A-C show a flowchart of steps taken to deploy in a Virtual Private Network (VPN) software that is capable of executing the steps shown and described in FIG. 5.
Figure 7B:
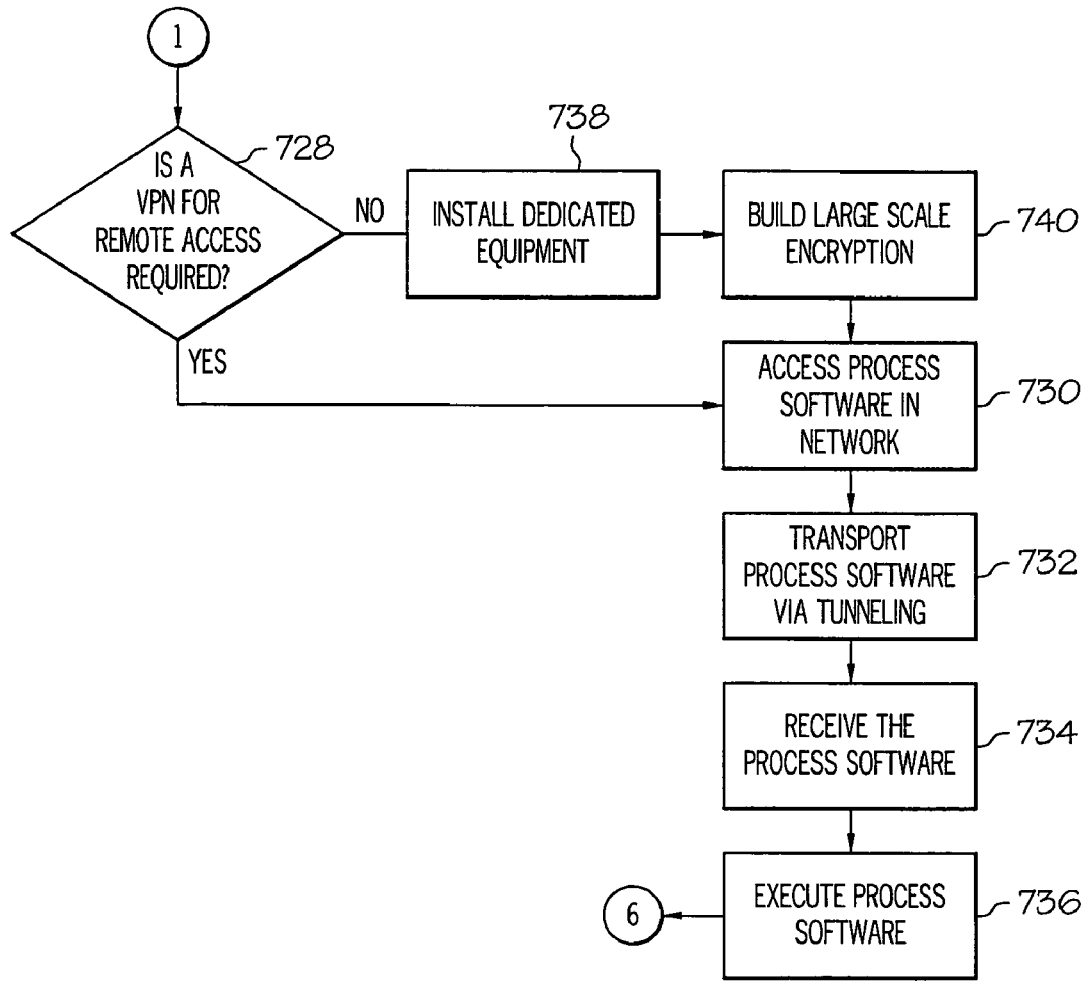
Figure 7C:
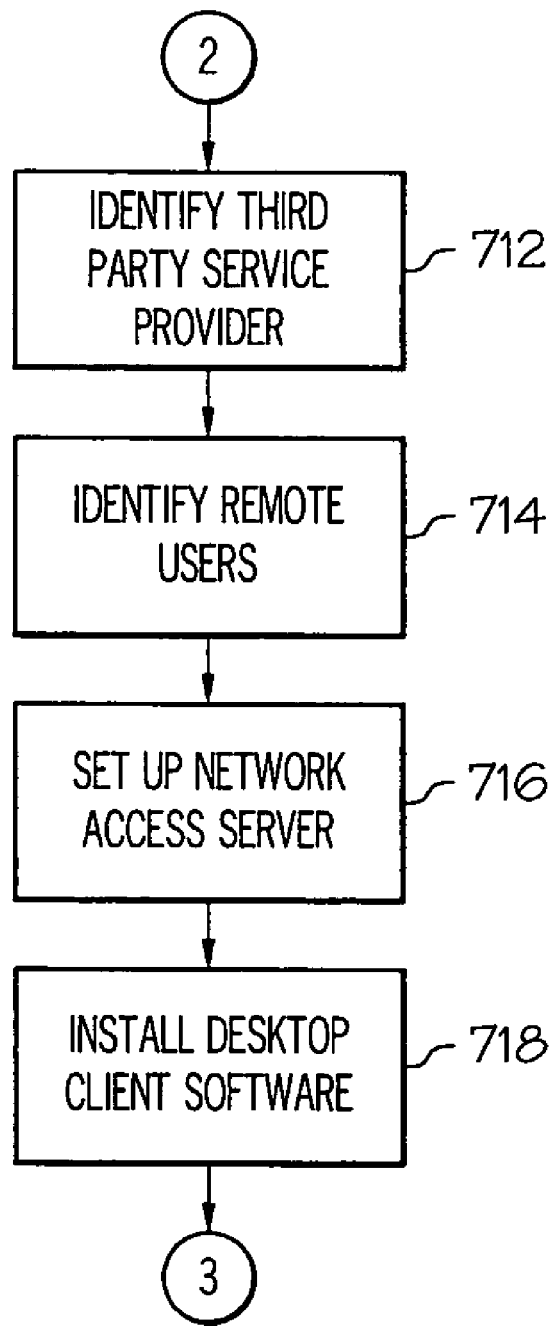

The process for such VPN deployment is described in FIG. 7. Initiator block 702 begins the Virtual Private Network (VPN) process. A determination is made to see if a VPN for remote access is required (query block 704). If it is not required, then proceed to (query block 706). If it is required, then determine if the remote access VPN exists (query block 708).

If a VPN does exist, then proceed to block 710. Otherwise identify a third party provider that will provide the secure, encrypted connections between the company's private network and the company's remote users (block 712). The company's remote users are identified (block 714). The third party provider then sets up a network access server (NAS) (block 716) that allows the remote users to dial a toll free number or attach directly via a broadband modem to access, download and install the desktop client software for the remote-access VPN (block 718).

After the remote access VPN has been built or if it has been previously installed, the remote users can access the process software by dialing into the NAS or attaching directly via a cable or DSL modem into the NAS (block 710). This allows entry into the corporate network where the process software is accessed (block 720). The process software is transported to the remote user's desktop over the network via tunneling. That is, the process where software is divided into packets and each packet including the data and protocol is placed within another packet (block 722). When the process software arrives at the remote user's desktop, it is removed from the packets, reconstituted and then is executed on the remote user's desktop (block 724).

A determination is then made to see if a VPN for site to site access is required (query block 706). If it is not required, then proceed to exit the process (terminator block 726). Otherwise, determine if the site to site VPN exists (query block 728). If it does exist, then proceed to block 730. Otherwise, install the dedicated equipment required to establish a site to site VPN (block 738). Then build the large scale encryption into the VPN (block 740).

After the site to site VPN has been built or if it had been previously established, the users access the process software via the VPN (block 730). The process software is transported to the site users over the network via tunneling (block 732). That is the process software is divided into packets and each packet including the data and protocol is placed within another packet (block 734). When the process software arrives at the remote user's desktop, it is removed from the packets, reconstituted and is executed on the site user's desktop (block 736). The process then ends at terminator block 726.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8A:
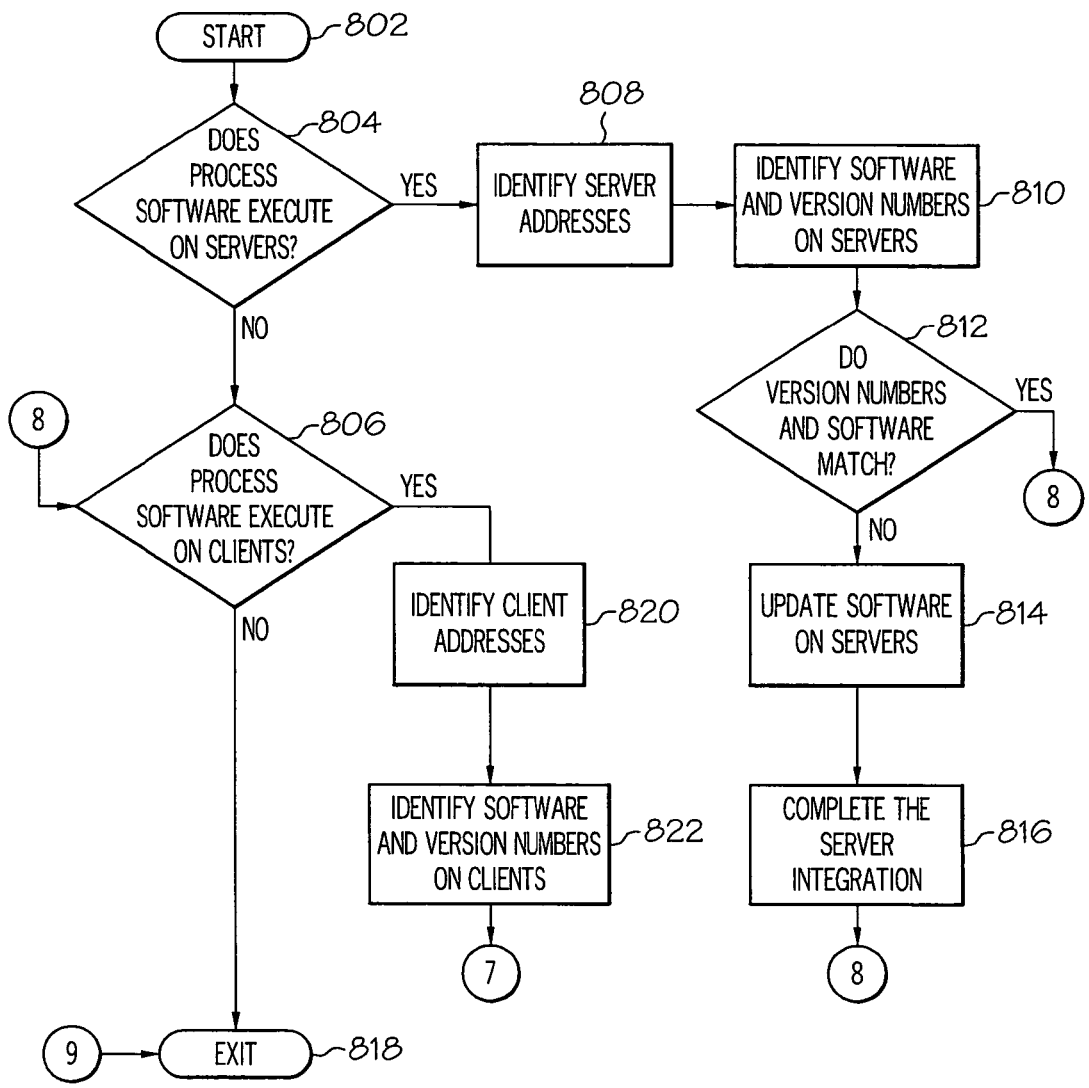
FIGS. 8A-B show a flowchart showing steps taken to integrate into a computer system software that is capable of executing the steps shown and described in FIG. 5.
Figure 8B:
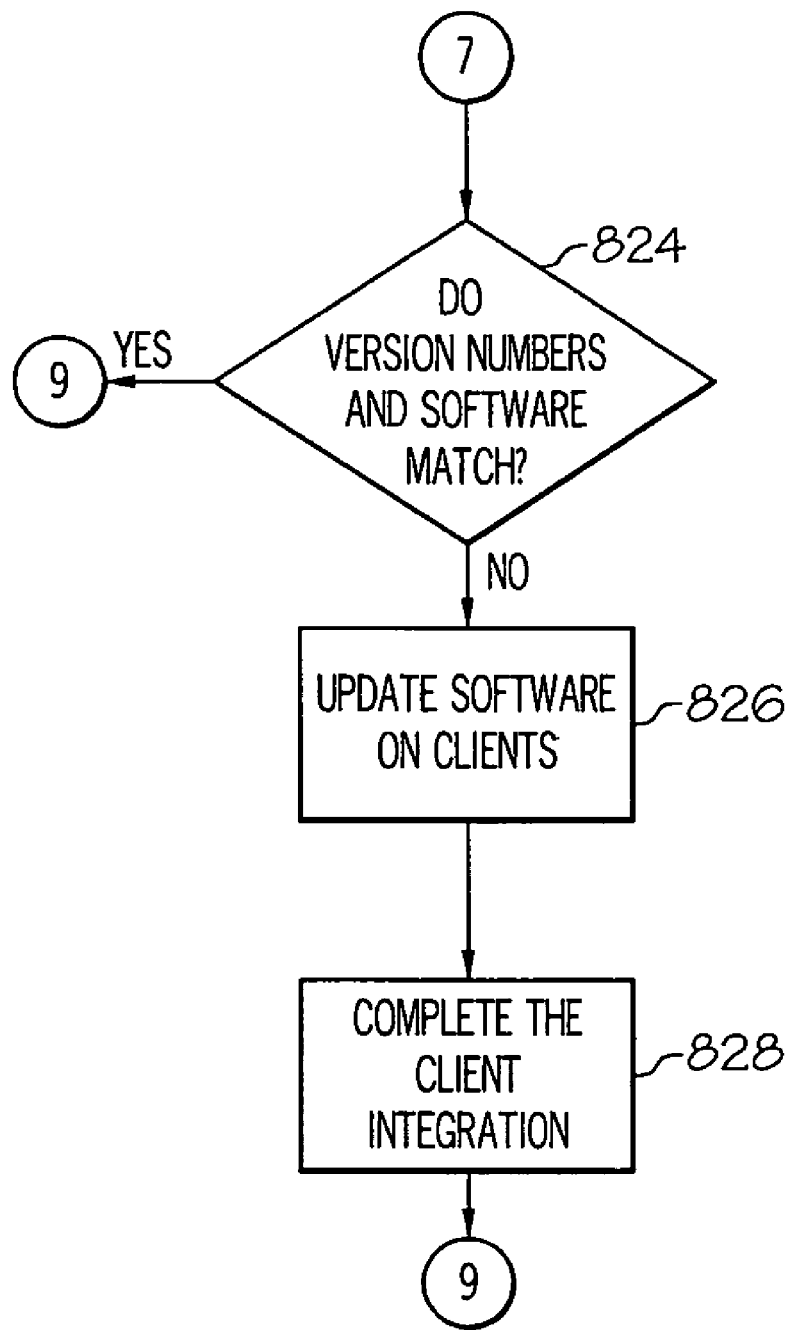

For a high-level description of this process, reference is now made to FIG. 8. Initiator block 802 begins the integration of the process software. The first tiling is to determine if there are any process software programs that will execute on a server or servers (block 804). If this is not the case, then integration proceeds to query block 806. If this is the case, then the server addresses are identified (block 808). The servers are checked to see if they contain software that includes the operating system (OS), applications, and network operating systems (NOS), together with their version numbers, which have been tested with the process software (block 810). The servers are also checked to determine if there is any missing software that is required by the process software in block 810.

A determination is made if the version numbers match the version numbers of OS, applications and NOS that have been tested with the process software (block 812). If all of the versions match and there is no missing required software the integration continues in query block 806.

If one or more of the version numbers do not match, then the unmatched versions are updated on the server or servers with the correct versions (block 814). Additionally, if there is missing required software, then it is updated on the server or servers in the step shown in block 814. The server integration is completed by installing the process software (block 816).

The step shown in query block 806, which follows either the steps shown in block 804, 812 or 816 determines if there are any programs of the process software that will execute on the clients. If no process software programs execute on the clients the integration proceeds to terminator block 818 and exits. If this is not the case, then the client addresses are identified as shown in block 820.

The clients are checked to see if they contain software that includes the operating system (OS), applications, and network operating systems (NOS), together with their version numbers, which have been tested with the process software (block 822). The clients are also checked to determine if there is any missing software that is required by the process software in the step described by block 822.

A determination is made is if the version numbers match the version numbers of OS, applications and NOS that have been tested with the process software (query block 824). If all of the versions match and there is no missing required software, then the integration proceeds to terminator block 818 and exits.

If one or more of the version numbers do not match, then the unmatched versions are updated on the clients with the correct versions (block 826). In addition, if there is missing required software then it is updated on the clients (also block 826). The client integration is completed by installing the process software on the clients (block 828). The integration proceeds to terminator block 818 and exits.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
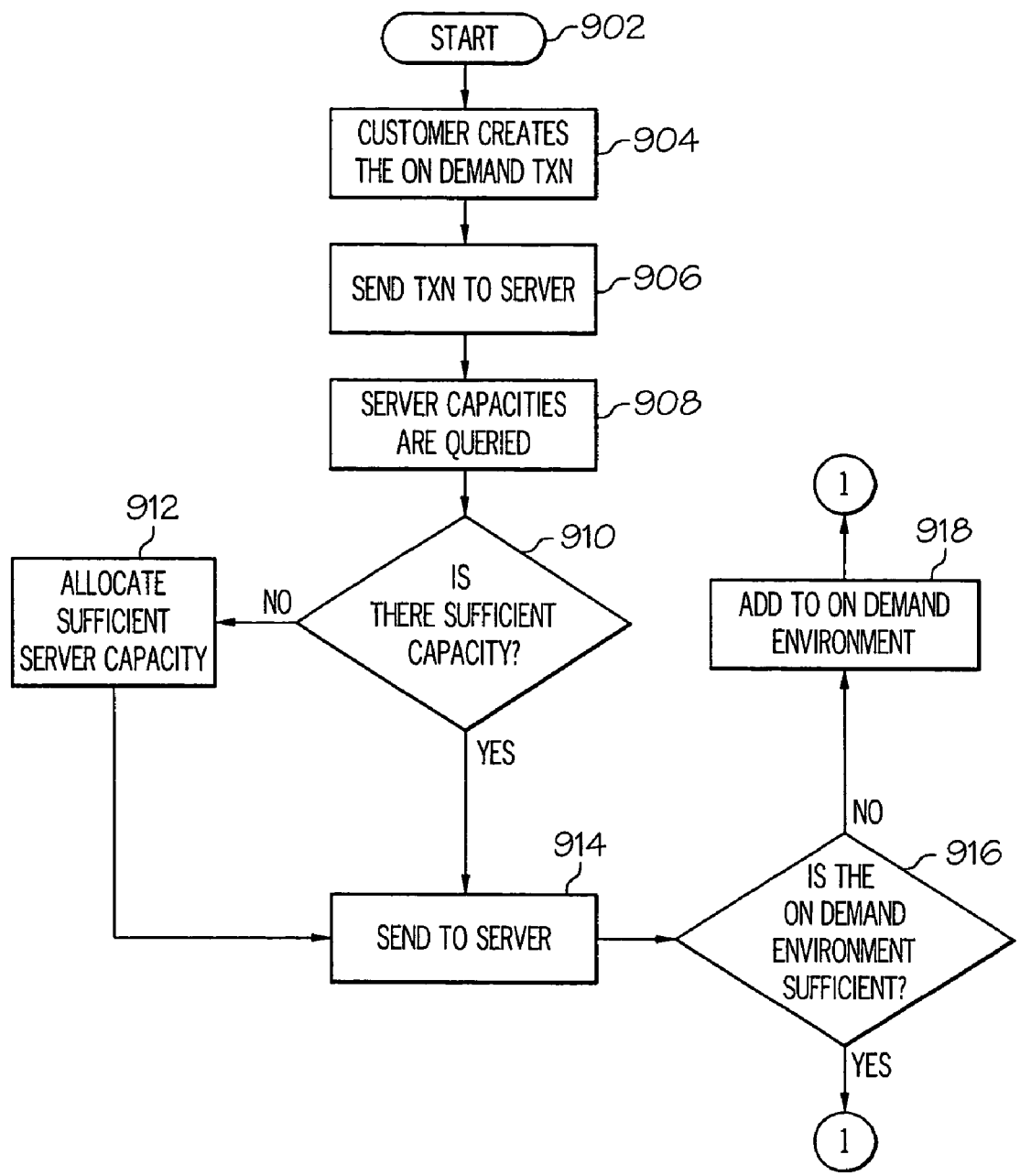
FIGS. 9A-B show a flowchart showing steps taken to execute the steps shown and described in FIG. 5 using an on-demand service provider.
Figure 9B:
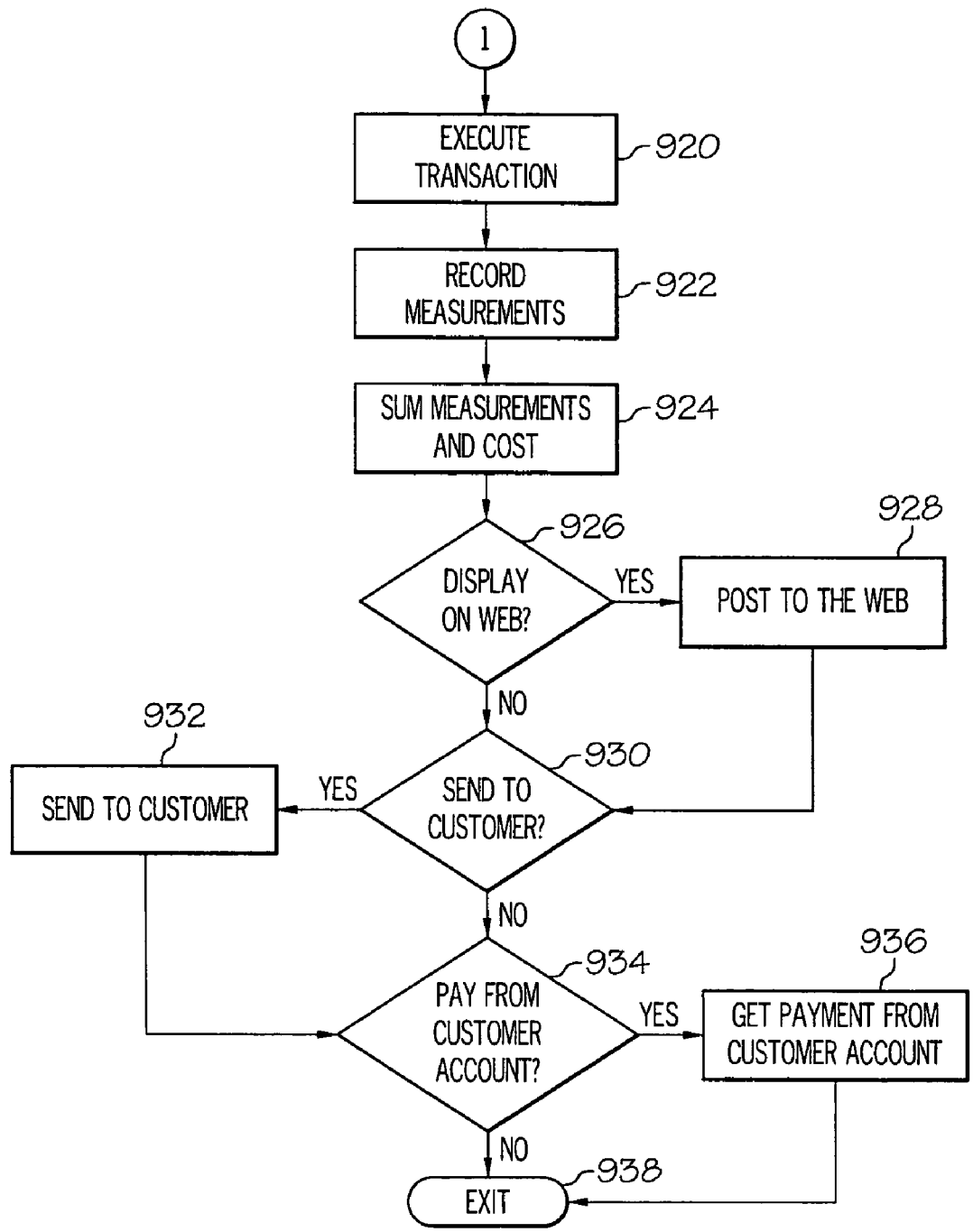

With reference now to FIG. 9, initiator block 902 begins the On Demand process. A transaction is created than contains the unique customer identification, the requested service type and any service parameters that further, specify the type of service (block 904). The transaction is then sent to the main server (block 906). In an On Demand environment the main server can initially be the only server, then as capacity is consumed other servers are added to the On Demand environment.

The server central processing unit-(CPU) capacities in the On Demand environment are queried (block 908). The CPU requirement of the transaction is estimated, then the servers available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:
receiving a logon, at a server, from a first user, wherein the server supports a real-time instant text messaging function between the first user and a second user, wherein the first user is a receiver of a real-time instant text message and the second user is a sender of the real-time instant text message;
receiving, at the server, a selection of at least one attribute among a plurality of attributes utilized to describe at least one sender from a plurality of senders, wherein the plurality of senders are sending users of the real-time instant text messaging function, wherein each of the plurality of attributes includes sender information about the sender of the real-time instant text message, and wherein each sender information includes a first name of the sender, a last name of the sender, a middle initial of the sender, a phone number of the sender, a title of the sender, and a workgroup of which the sender is a member;
assigning a unique notification signal to a subset of the plurality of attributes, wherein the subset nonexclusively describes the second user; and
in response to the first user receiving the real-time instant text message from the second user, transmitting the unique notification signal to the first user, wherein the unique notification signal is a single notification that is specific for any sending user that has attributes that match all of the subset of the plurality of attributes.

2. The computer-implemented method according to claim 1, wherein said unique notification is a simultaneously transmitted combination of an audio alert, a visual alert and a tactile alert.

3. The computer-implemented method according to claim 1, wherein said logging on to said server further comprises:
sending a collection of connection information to said server to enable said server to relay messages from the plurality of senders to the first user.

4. The system comprising:
a processor;
a data bus coupled to said processor;
a memory coupled to said data bus; and
a computer-usable storage medium embodying computer program code, the computer-usable storage medium being coupled to the memory via the data bus, the computer program code comprising instructions executable by said processor and configured for:
receiving a logon, at a server, from a first user, wherein the server supports a real-time instant text messaging function between the first user and a second user, wherein the first user is a receiver of a real-time instant text message and the second user is a sender of the real-time instant text message;
receiving, at the server, a selection of at least one attribute among a plurality of attributes utilized to describe at least one sender from a plurality of senders, wherein the plurality of senders are sending users of the real-time instant text messaging function, wherein each of the plurality of attributes includes sender information about the sender of the real-time instant text message, and wherein each sender information includes a first name of the sender, a last name of the sender, a middle initial of the sender, a phone number of the sender, a title of the sender, and a workgroup of which the sender is a member;

assigning a unique notification signal to a subset of the plurality of attributes, wherein the subset nonexclusively describes the second user; and in response to the first user receiving the real-time instant text message from the second user, transmitting a single notification to the first user, wherein the single notification is specific for any sending user that has attributes that match all of the subset of the plurality of attributes.

5. The system according to claim 4, wherein said unique notification is a simultaneously transmitted combination of an audio alert, a visual alert and a tactile alert.

6. The system according to claim 4, wherein said instructions are further configured for:

sending a collection of connection information to said server to enable said server to relay messages from the plurality of senders to the first user.

7. A tangible computer-usable storage medium embodying computer program code, said computer program code comprising computer executable instructions configured for:

receiving a logon, at a server, from a first user, wherein the server supports a real-time instant text messaging function between the first user and a second user, wherein the first user is a receiver of a real-time instant text message and the second user is a sender of the real-time instant text message;

receiving, at the server, a selection of at least one attribute among a plurality of attributes utilized to describe at least one sender from a plurality of senders, wherein the plurality of senders are sending users of the real-time instant text messaging function, wherein each of the plurality of attributes includes sender information about the sender of the real-time instant text message, and wherein each sender information includes a first name of the sender, a last name of the sender, a middle initial of the sender, a phone number of the sender, a title of the sender, and a workgroup of which the sender is a member;

assigning a unique notification signal to a subset of the plurality of attributes, wherein the subset nonexclusively describes the second user; and in response to the first user receiving the real-time instant text message from the second user, transmitting a single notification to the first user, wherein the single notification is specific for any sending user that has attributes that match all of the subset of the plurality of attributes.

8. The tangible computer-usable storage medium according to claim 7, wherein said unique notification is a simultaneously transmitted combination of an audio alert, a visual alert and a tactile alert.

9. The tangible computer-usable storage medium according to claim 7, wherein said embodied computer program code further comprises computer executable instructions configured for:

sending a collection of connection information to said server to enable said server to relay messages from the plurality of senders to the first user.

10. The tangible computer-usable storage medium according to claim 7, wherein said computer executable instructions are deployed to a client computer from a server at a remote location.

11. The tangible computer-usable storage medium according to claim 7, wherein said computer executable instructions are provided by a service provider to a customer on an on-demand basis.

* * * * *